US 8,306,985 B2
Nov. 6, 2012

(12) United States Patent
Flippo

(54) SYSTEM AND METHOD FOR INCREASING SEARCH RANKING OF A COMMUNITY WEBSITE

(75) Inventor: Chad Alton Flippo, Antrium, NH (US)

(73) Assignee: Roblox Corporation, San Mateo, CA (US)

( * ) Notice: Subject to any disclaimer, the term of this patent is extended or adjusted under 35 U.S.C. 154(b) by 277 days.

(21) Appl. No.: 12/617,956

(22) Filed: Nov. 13, 2009

(65) Prior Publication Data

US 2011/0119275 A1    May 19, 2011

(51) Int. Cl.
*G06F 17/30* (2006.01)
(52) U.S. Cl. ........................................ 707/748; 707/899
(58) Field of Classification Search .................. 707/3, 6, 707/5, 100, 120, 611, 104, 713, 759, 10
See application file for complete search history.

(56) References Cited

U.S. PATENT DOCUMENTS

| | | | |
|---|---|---|---|
| 7,546,295 B2* | 6/2009 | Brave et al. ........................... 1/1 |
| 7,697,791 B1* | 4/2010 | Chan et al. ..................... 382/305 |
| 7,734,610 B2* | 6/2010 | Rakowski et al. ............ 707/706 |
| 7,752,251 B1* | 7/2010 | Shuster et al. ................. 709/200 |
| 7,801,885 B1* | 9/2010 | Verma ............................ 707/713 |
| 7,877,353 B2* | 1/2011 | Ahmed et al. ................. 707/611 |
| 7,908,262 B2* | 3/2011 | Agranoff et al. .............. 707/706 |
| 2005/0177561 A1* | 8/2005 | Ramanathan et al. ............ 707/3 |
| 2005/0246358 A1* | 11/2005 | Gross ............................ 707/100 |
| 2006/0253458 A1* | 11/2006 | Dixon et al. ..................... 707/10 |
| 2006/0293961 A1* | 12/2006 | Elias ................................ 705/14 |
| 2006/0294124 A1* | 12/2006 | Cho .............................. 707/101 |
| 2007/0016563 A1* | 1/2007 | Omoigui ........................... 707/3 |
| 2007/0260628 A1* | 11/2007 | Fuchs et al. ..................... 707/101 |
| 2007/0271234 A1* | 11/2007 | Ravikiran ............................ 707/3 |
| 2007/0271246 A1* | 11/2007 | Repasi et al. ...................... 707/3 |
| 2008/0082528 A1* | 4/2008 | Bonzi et al. ....................... 707/5 |
| 2008/0109491 A1* | 5/2008 | Gupta ....................... 707/104.1 |
| 2008/0114738 A1* | 5/2008 | Chao ................................ 707/3 |
| 2008/0155019 A1* | 6/2008 | Wallace et al. ............... 709/204 |
| 2008/0294637 A1* | 11/2008 | Liu .................................... 707/6 |
| 2009/0006469 A1* | 1/2009 | Jain et al. ................... 707/104.1 |
| 2009/0259646 A1* | 10/2009 | Fujita et al. ........................ 707/5 |
| 2010/0042577 A1* | 2/2010 | Rinearson ....................... 706/56 |
| 2010/0049709 A1* | 2/2010 | Ravikumar et al. ............... 707/6 |
| 2010/0169313 A1* | 7/2010 | Kenedy et al. ................ 707/736 |
| 2010/0306213 A1* | 12/2010 | Taylor et al. .................. 707/759 |

\* cited by examiner

*Primary Examiner* — James Trujillo
*Assistant Examiner* — Thong Vu
(74) *Attorney, Agent, or Firm* — Donald R. Boys; Central Coast Patent Agency, Inc.

(57) ABSTRACT

A system for increasing search ranking of a community Website includes a link code application module residing on and executable from a digital medium, a link verification module residing on and executable from the digital medium, and a member feedback module residing on and executable from the digital medium for providing feedback about link quality and for distributing rewards to persons using the system.

8 Claims, 5 Drawing Sheets

SYSTEM AND METHOD FOR INCREASING SEARCH RANKING OF A COMMUNITY WEBSITE

BACKGROUND OF THE INVENTION

1. Field of the Invention

The present invention is in the field of network communication, more particularly Internet communication, and pertains particularly to methods and apparatus for automatically increasing search ranking for a community Website to promote growth of the Website.

2. Discussion of the State of the Art

With the advent of the Internet network, community Websites have been developed that persons subscribe to in order to network with others. There are different types of community Websites on the Internet. For the purposes of discussion, a gaming site serves as an example of a community Website whereby users gather online to play online games. Typically community Websites provide chat services, email services, blogs, and other amenities for subscribers to the community.

Websites on the Internet are often found by searching the Internet using a search engine interface provided by a typical search engine company of which there are many known in the art. There are a very large number of Web pages listed in search engine databases of the various search engine companies. These pages are searchable by keyword or phraseology typed into a search engine interface. For commercial sites and sites that need to attract members like community Websites, high ranking in the top search engine databases is critical. Search engine companies rank Web pages based on several criteria that may very slightly from company to company. Among these are keyword relevancy and the number of external links that point to the Web page.

It is desired that a community Website enjoy high search engine ranking in order to promote growth of the Website membership and to increase traffic to advertising at the site, however current means of increasing search engine rankings can be very costly and time consuming.

Therefore, what is clearly needed is a system for increasing search ranking of a community Web site. A system such as this would solve the problems stated above.

SUMMARY OF THE INVENTION

The problem stated above is that it is desired that a community Website enjoy high search engine ranking in order to promote growth of the site membership and to increase traffic to the site advertising, however current means of increasing search engine rankings can be overwhelmingly costly and time consuming. The inventors therefore considered functional elements of a search engine looking for elements that exhibit relevancy that could potentially be harnessed to provide cross linking to a community Website but in a manner that would not create significant labor and cost.

Every Website is depends on search engine ranking to garner exposure, one by-product of which is an up tic in community memberships. Most such Websites employ search keywords and cross linkages to improve the overall search ranking and position of the site in search engine results. A network of cross links between the community site and other electronic form types including Web pages are typically a part of such apparatus.

The present inventor realized in an inventive moment that if, at the point of interface, community members could be caused to create links to the community Website on their own Web pages and other electronic form types, significant improvement in search engine ranking of the community Website might result. The inventor therefore constructed a unique promotional system that allowed community Website members to easily add quality links to the community Website on their own electronic form types, but discouraged such linkage that might not be relevant to community growth. A significant increase in community membership results with no significant addition of cost and labor.

Accordingly, in an embodiment of the present invention, a system for increasing search ranking of a community Web site is provided, comprising a link code application module residing on and executable from a digital medium coupled to the community Web site, the application module accessible by persons linking to the community web site and having control of one or more electronic forms, including Web sites other than the community Web site, a link verification module residing on and executable from the digital medium, and a member feedback module residing on and executable from the digital medium for providing feedback about link quality to the persons accessing and using the application module, and for distributing rewards and other feedback to said persons.

In one embodiment the system is configured as a Web application running on a Web server. Also in one embodiment the link code application module is executed remotely by members accessing the module using a browser application. The link code application module may include a variety of different coding types for adding one or more links in one or more of the electronic forms or Web pages other than the community Web site, the links directing browsing entities to the community Web site.

In embodiments of the invention persons accessing the link code application module may copy link code from the module and paste it into their electronic form or Web page. In some cases the link verification module accesses the member's electronic form or Web page and verifies the link to the community Web site. Also the link verification module may evaluate the quality of the member's electronic form or Web page newly linking to the community Web site, the form evaluated for content relevancy and search keywords.

In some embodiments the member feedback module pushes information to persons accomplishing linking through the application module relative to the quality of their contribution of linking to the community site. Also in some embodiments the member feedback module distributes rewards to members based on the evaluated quality of their link contribution. The rewards may include but are not limited to reciprocal linking, virtual currency usable at the community Web site, and free access to activities at the community Web site.

In another aspect of the invention a method for increasing search engine rankings for a community Web site is provided, comprising the steps of (a) creating a link code application module and loading it with at least one complete code set for establishing a link to the community Web site; (b) making the link code application module accessible to persons hosting electronic forms or Web pages other than the community Web site; (c) accessing, by one of the persons, the link code application module, copying code from the link code application module, pasting the code into the electronic form or Web page, establishing a link to the community Web site; (d) verifying the links and evaluating the quality of established and working links; and (e) providing feedback and rewards to the persons who contributed by linking their electronic form or Web page to the community Web site.

In some embodiments of the method in step (a) the link is a universal resource locator and includes a text statement promoting an activity at the community Web site. Also in some embodiments of the method, in step (b) the link code application module is accessible through a page on the community Web site. Steps (c), (d), and (e) may be repeated for each link to the community site established by the persons.

In some cases the electronic form types include other Web sites, Blogs, or social interaction site profile pages. Further, in step (e) the feedback may include a quality ranking of the member's contribution. In step (e) the rewards may include reciprocal linking, virtual currency usable at the community Web site, and free access to activities at the community Web site, and, in step (d) the links may be automatically tested and content and keywords evaluated for relevancy to determine a quality ranking for the member contribution.

BRIEF DESCRIPTION OF THE DRAWING FIGURES

DETAILED DESCRIPTION

The inventors provide a system and methods for increasing search ranking of a community Web site. The present invention is described in enabling detail below.

Figure 1:
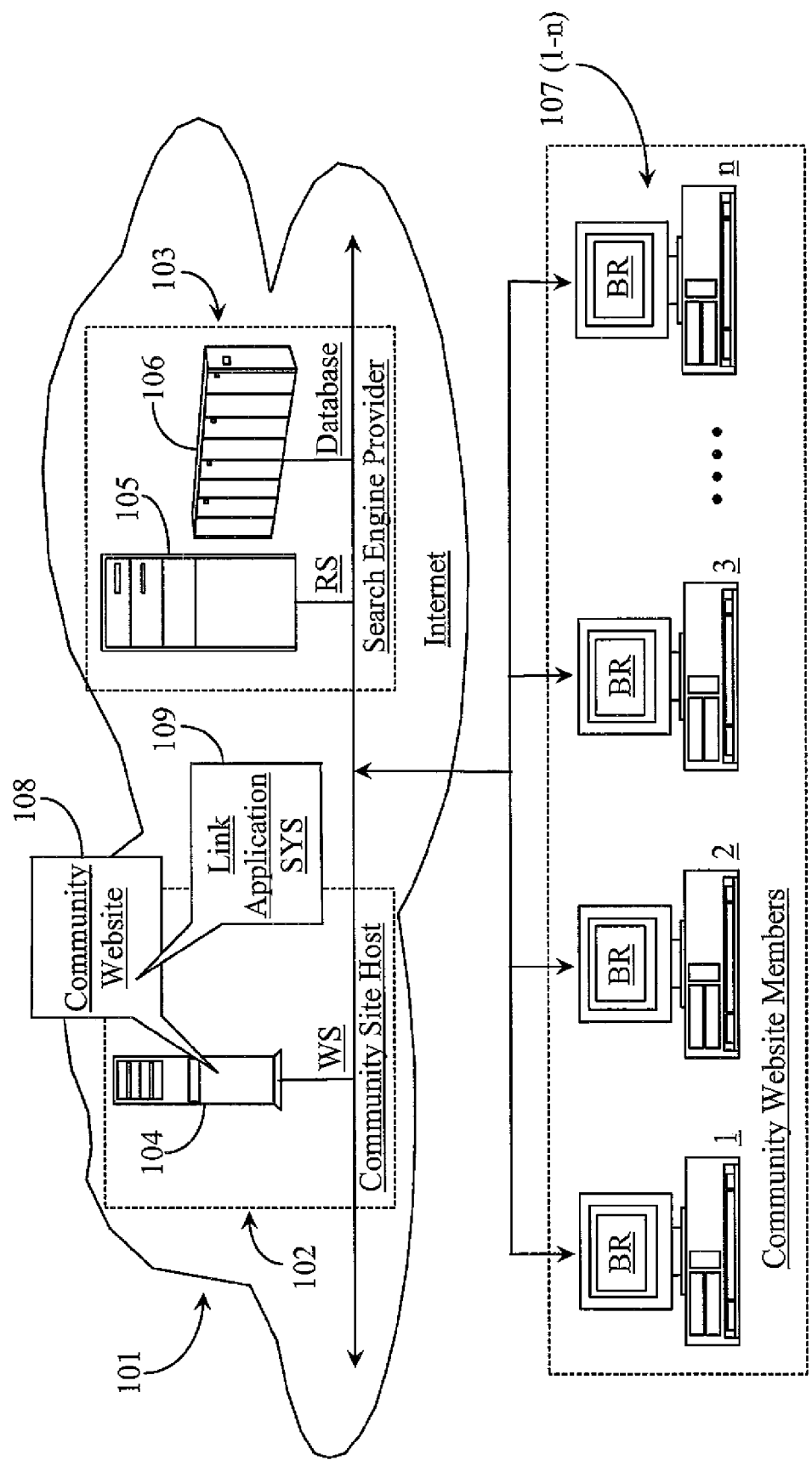
FIG. 1 is an architectural view illustrating interaction between community Website members and a community Website host according to an embodiment of the present invention.

FIG. 1 is an architectural view illustrating interaction between community Website members and a community Website host according to an embodiment of the present invention. A community Website host 102 is illustrated within an Internet network 101. Website host 102 represents any hosting service responsible for hosting and maintaining Web services such as commercial and community Websites for subscribing clients. Internet 101 is further defined by an Internet backbone 110 that represents all of the equipment, lines, and access points that make up the Internet as a whole including any connected sub-networks. Therefore, there is no geographic limitation to practice of the present invention.

Website host 102 maintains a Web server (WS) 104 connected to Internet backbone 110. WS 104 is adapted to store and serve electronic information pages or Web pages. Among a host of other types of Websites, WS 104 hosts a community Website 108. Community Website 108 is accessible over the Internet to any user operating an Internet capable appliance running a Web browser. Users may subscribe to community Website 108 and become community members of the site. Community Website 108 may represent any site that provides a platform where members may interact with one another such as by gaming or some other social interaction.

Several community Website members 107 (1-n) are illustrated in this example as computers running Web browsers (BR) for accessing and navigating Internet 101. Community Website members 107 (1-n) are logically illustrated in this example connected to Internet backbone 110. One with skill in the art of Internet connection will appreciate the various ways that are available to connect one to Internet services. Community Website members 107 (1-n) are members of community Website 108.

A search engine provider 103 is illustrated in this example and provides search engine services to companies and individuals. Search engine provider 103 includes a Website ranking and indexing server (RS) 105 and a search engine database 106. Database 106 is connected to Internet backbone 110 and is adapted to store searchable links to Web pages on the Internet. As described previously with respect to the background section of this specification, it is desirable that community website 108 enjoy the highest possible search engine ranking with search engine provider 103 and like provider companies. One criteria that is important to a search engine ranking process is the quantity of external sites or pages that link to the community Website, or more particularly to a specific part or page of the Website that the Website is trying to promote. One example of a specific page of the community Website might be a free games page that allows members and potential members to try out free games.

In practice of the present invention, community Website 108 contains a hyperlink to a link application system 109 that helps community members having their own personal Web-sites to install a link to the community Website in a way that educates the community members about various aspects of search engine ranking and placement, enables a semi-automatic link installation, and provides feedback including incentive for interacting with the system. It is presumed that all members 107 (1-n) have at least one of their own Web pages or sites from which to link to the community Website.

Any of community Website members 107 (1-n) may log onto Community Website 108 hosted in WS 104 and may access link application system 109 to establish a link from their personal Web forms to community Website 108. The provider of community Website 108 might also provide an incentive to community Website members to link to the site including offering free games, virtual currency, and reciprocating by linking back to community member pages. Links created by community Website members 107 (1-n) are verified and evaluated by link application system 109. All of the links created by the community members through link application system 109 are recorded along with the community Website member URLs (personal sites linked) and contact information if required by the system.

In this example, Web link code is provided that may be copied and pasted into a target Web page markup by the community Website members. Each link created may be downloaded and evaluated in terms of relevancy and content to determine a quality level for each link. Link application system 109 may include member feedback relative to the quality of or lack of quality of the link created and further, may give notice of certain preplanned rewards that may be given to members as incentive for participation in linking of the sites.

Figure 2:
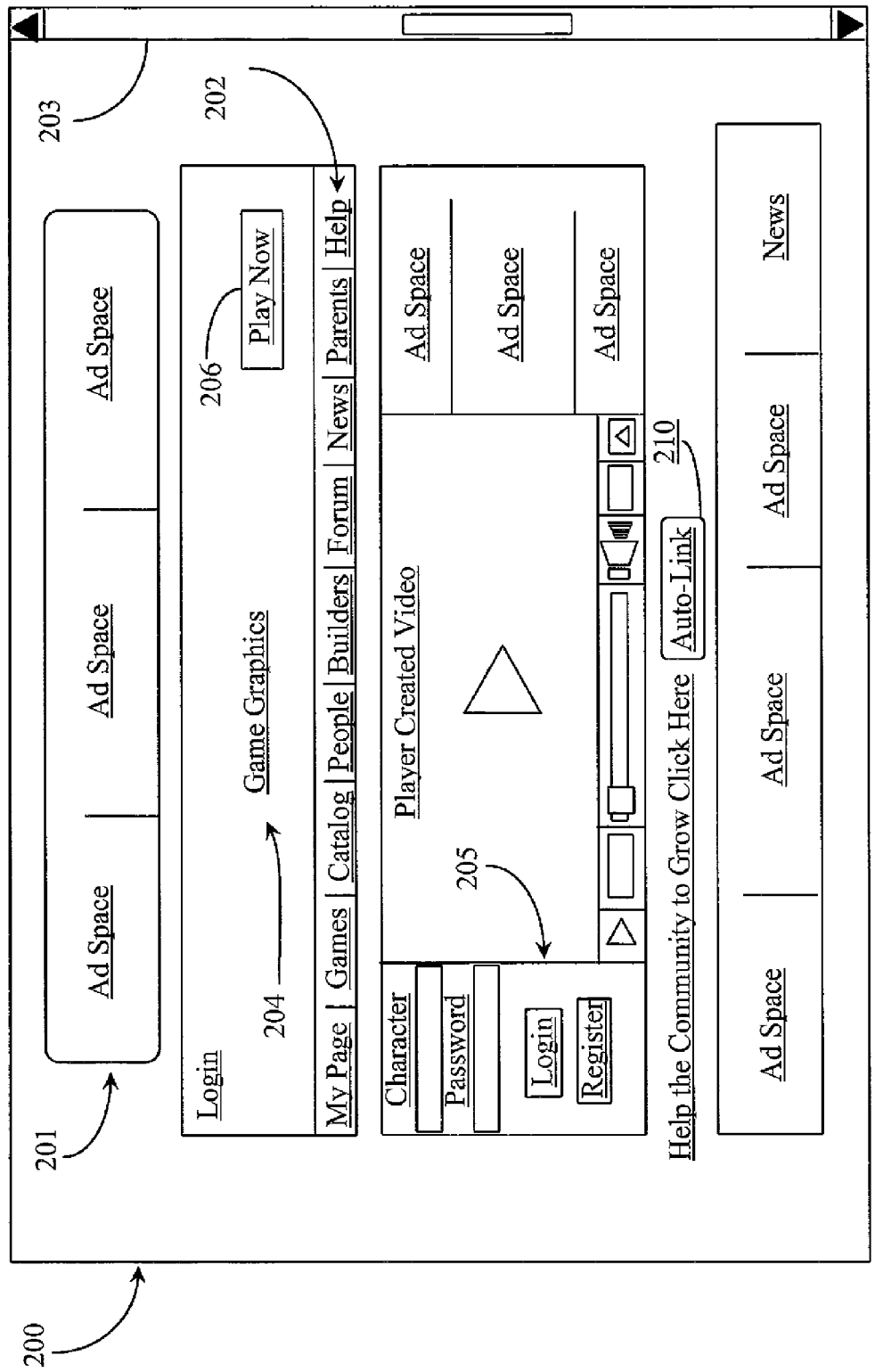
FIG. 2 is an exemplary screen shot of a community Website page that provides automatic link to and link verification according to an embodiment of the present invention.

FIG. 2 is an exemplary screen shot of a community Website page 200 that provides automatic link to and link verification according to an embodiment of the present invention. Community Web page 200 is an exemplary Web page of Community Website 108 of FIG. 1. Web page 200 may be a publicly accessible start page where potential community Website members may register for a subscription to the Website and services offered through the Website. A registration and login interface 205 enables current members to login to the site to access their personalized start page or "My Page" listed in menu options 202. In this example, other menu options include Games, Catalog, People, Game Builders, Forum, News, Parents, and Help. In this the community Website is a community gaming site where members of the site interact through game play, forums, and other socially interactive mechanisms.

Web page 200 includes a scroll bar 203 for scrolling through the Web page to access all of the Website options and services. Web page 200 includes a banner containing a login option; game graphics advertising one or more online games, and a play now option 206. A community Website such as one including page 200 relies heavily on advertising to develop needed revenue. Advertising space 201 is strategically located throughout the page including above and below member interactive and opposite login and registration block 205 in this example. An option for receiving a gaming newsletter is also provided. In the center of page 200 is a video interface for viewing player-created video.

Community Website page 200 contains an auto link option 210 for community members of the site to help the Website gain more members. Auto link 210 links community members to a link application system like link application system 109 of FIG. 1 above. The system aids growth of the community Website by providing a simple and efficient interface that allows members of the site to link their own personal Web forms or pages to the community Website in order to garner higher search engine rankings.

Figure 3:
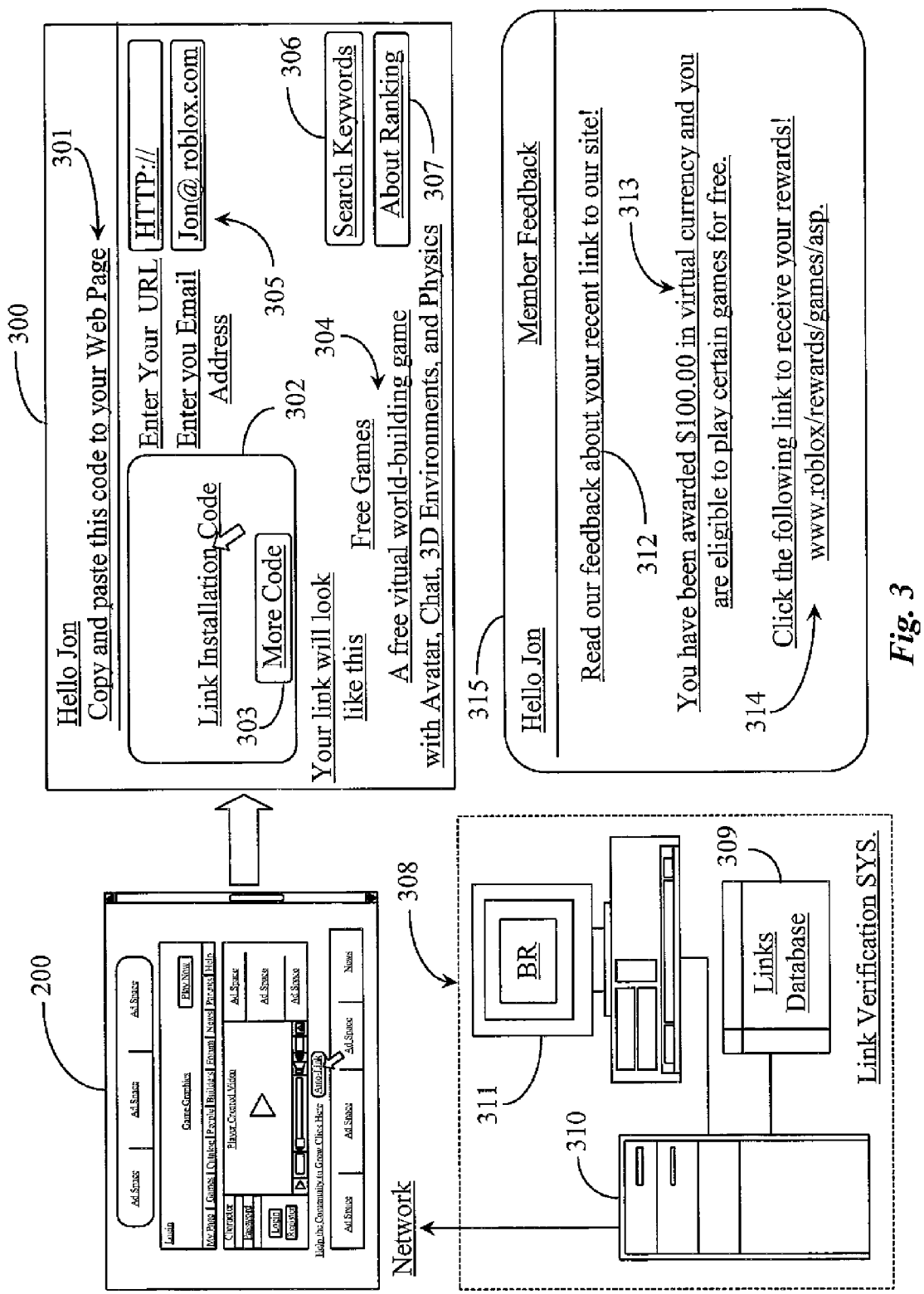
FIG. 3 is a block diagram illustrating basic components of the present invention and interaction thereof according to an embodiment of the present invention.

FIG. 3 is a block diagram illustrating basic components of the present invention and interaction thereof according to an embodiment of the present invention. Web page 200 of FIG. 2 is illustrated in miniature form in this example to preserve drawing space. A community Website member interacting with the auto-link option (210) is served a personalized auto-link interface 300. Interface 300 greets the community Website member and includes an instruction 301 indicating that the link installation code may be copied from a code window 302 and pasted into the markup of the personal Web page of the member. In one embodiment hypertext transfer markup language (HTML) code is provided in window 302 as the link installation code for establishing a Web link with anchor text from the community Website member's personal Web page to a community Web page. In another embodiment an interactive option 303 enables the user to see link code for use with various formatting styles and different markup languages like cascading style sheet (CSS), active server page (ASP), Java server page (JSP), and wireless application protocol (WAP).

Auto-link interface 300 includes one or more entry fields 305 for the community Website member to enter the URL of the page containing the created link to the community Website. A field for entering the member's email address is also provided though the system may already have that information by virtue of member information taken during registration for membership to the Website. Interface 300 includes a sample of what the installed link will look like on a Web page linked to the community Website page. After a user copies and pastes the link code into their own personal Web page, Blog, or other electronic form, the system may ask for the URL where the newly created link can be navigated to. Interface 300 also includes an interactive option 306 for looking at relevant search keywords that might aid in publishing anchor text. Another interactive option 307 is provided on Web interface 300 and is adapted to enable a user access to a tutorial about Website ranking including, but not limited to tips and tricks.

In this example the Web link is a visible text anchor 304, informing anyone who might click on the link about free virtual world—building game with avatar, Chat, 3D environments, and physics. Text anchors are ranked by search engine companies and are regarded as one component that is desired to improve the link quality. Text anchors contain one or more relevant search keywords that describe the landing page or interactive linked to. The convenience of interface 300 to a Website community member is that it provides the written code including the suggested anchor text for the link. The code can be copied and pasted into the Web page that will host the link.

After a link has been established on an external Web page or form that links to the community Web site, more particularly, to the "Free Games" interactive, a link verification system 308 is used to navigate to the hosting Web page or form and execute the link. Link verification system 308 may comprise a computing system 311 having a monitor and browser (BR) installed for network navigation. A user operating computing system 311 may, with the aid of a browser and an Internet connection, navigate to any Web page or electronic form hosting a new link for the purpose of validating the working order of the link as part of the link evaluation and ranking process of the system of the invention. In one embodiment a server 310 may perform verification of links automatically. The only requirement for validation is that the system is able to connect to the network and automatically navigate to and execute the installed link to the community Website to validate the working status of the link.

In both cases, URLs and other locators provided by Website community members through interface 300 are stored in links database 309 for verification purposes. The addresses are retrieved by the navigation system (computer or server) from links database 309 and used to navigate to the hosting form whereby the link is then identified and executed to determine if it works. To work properly the link must cause successful network navigation to the Free Games Page on Website 200. In one embodiment the created links are also evaluated in terms of the relevance of the content of the link hosting page or form to the content linked to.

After a link is checked for working order and evaluated for relevance of contents, a member feedback notice or electronic window is delivered to or otherwise presented to the community Website member responsible for the link. Member feedback can appear in a placeholder on a personalized member page at the community Website. Member feedback may be in the form of a popup window or TOAST. Member feedback may be sent to the member in an email or other communication. In this example, member feedback interface 315 is found on the member's personal page at community Website 200.

Interface 315 contains a link 312 to the text feedback created by the verification and evaluation arm of the system of the present invention. Interface 315 contains a rewards statement 313 that informs the member of certain rewards given as an incentive for creating a link to the community Website that is effective in promoting growth of the community Website. This means that the link works, is highly relevant, and helps improve the overall search engine ranking of the community Website, which in turn promotes growth of the site membership. Interface 315 contains a link 314 with a text descriptor "Click the following link to receive your rewards". The link takes the user back to a gaming page at the site where the virtual currency is credited to the member and access to free games is possible. The rewards may vary widely depending on the actual type of community Website through which the invention is practiced.

It is noted herein that in some cases the created link might not work, or content at the link hosting site is not relevant to the community Website. Likewise other factors might exist that take away from the quality of the link such as the efficiency and ranking of the member's personal page or form hosting the link. Therefore, member feedback may, in some cases, be criticism or negative feedback relative to what might be wrong with the link and link quality. In this case education might be forthcoming to the member to help the member improve on the quality of the created link so that it may be re-evaluated with a higher ranking and therefore be worthy of rewards.

Using the system of the invention, the community Website provider has all of the locations of the external links to the community Website in a database link database 309. Other information may also be associated with such location information like member information, profile information, and information about content. In one embodiment information about quality of the link hosting pages or forms may also be associated with the location data (URLs). In This way the provider controls growth of the community Website by improving search engine ranking and attracting more traffic to the site. A byproduct of the system of the invention is an increase in ad revenue due to more traffic and ad hits received per advertisement.

Figure 4:
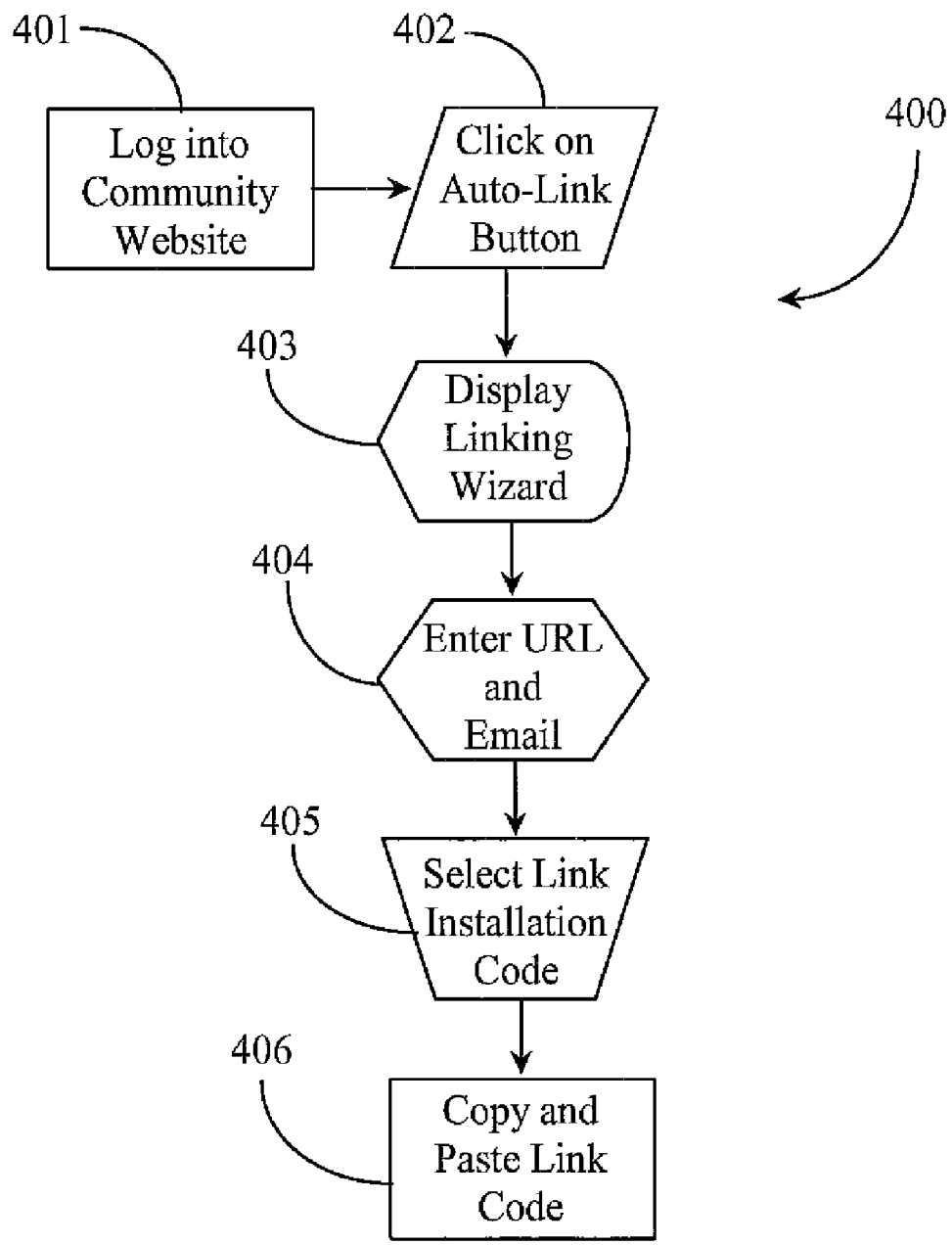
FIG. 4 is a process flow chart illustrating steps establishing a link to a community Website.

FIG. 4 is a process flow chart illustrating steps 400 for establishing a link to a community Website. At step 401 a community Website member logs into the community Website. At step 402 the member clicks on or otherwise invokes the auto-link button for establishing an external link to the community Website on a Web page of the member or on some other electronic form in control of the member. In one embodiment the member may provide the external link to the community Website on some Web page that the member does not own but has some control over the linkage at the site.

At step 403 the interaction with the auto-link button causes display of an automatic linking wizard analogous to interface 300 described further above. At step 404 the member enters the location information of the page or form hosting the installed link, typically a URL. Also in this step the member may provide an email address or other contact information. In one embodiment the system already knows the contact information of the member.

At step 405 the member selects the link installation code and copies the code and pastes the code into the host form at step 406. The form hosting the external link may be a Web page in most embodiments but an external link may also be installed in a Blog or on some other electronic document that supports linking and embedding such as in a power point presentation, a Google™ document, a Microsoft™ word document, an Adobe™ PDF document or others.

Figure 5:
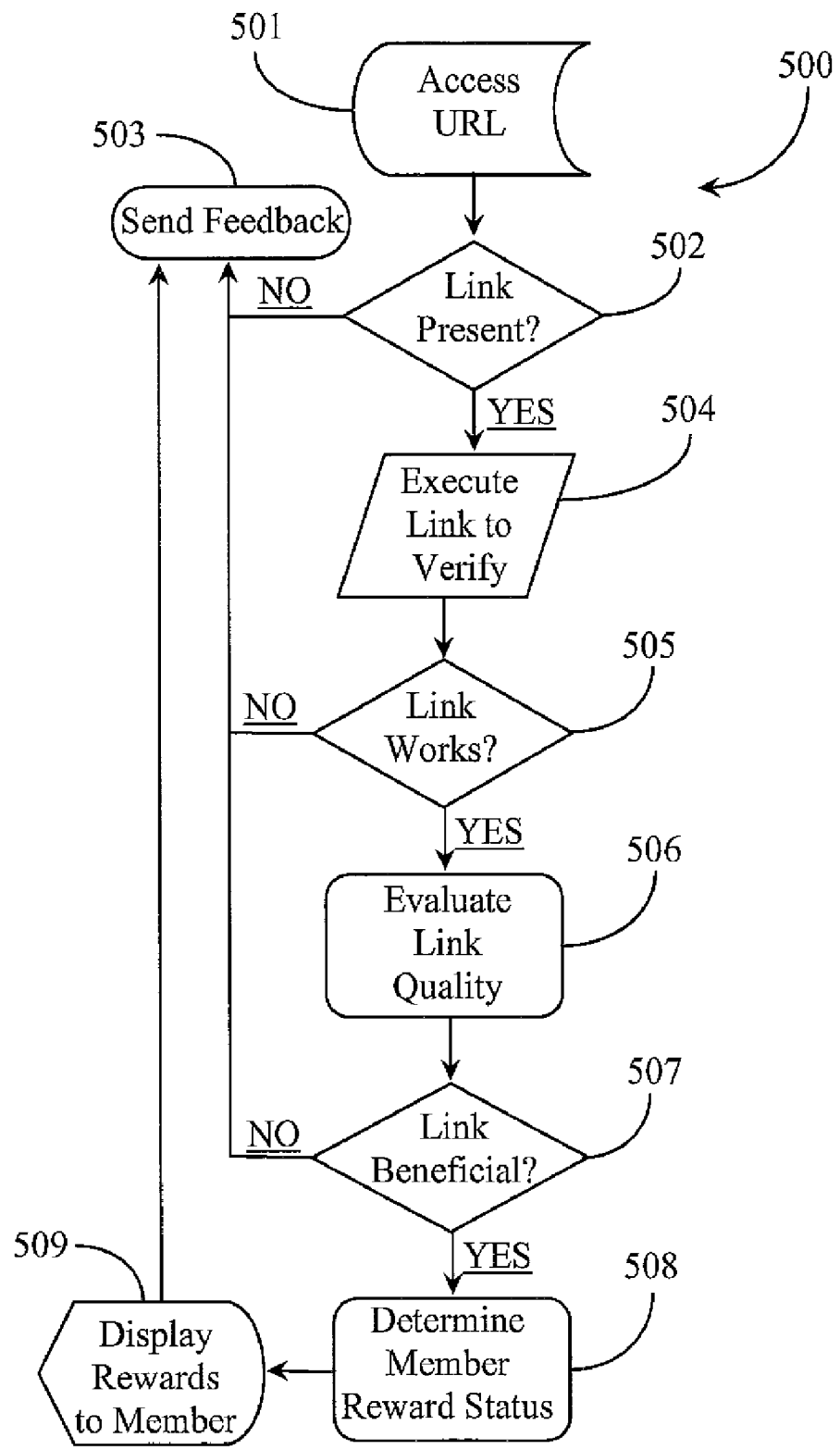
FIG. 5 is a process flow chart illustrating steps for evaluating links and providing member feedback according to an embodiment of the present invention.

FIG. 5 is a process flow chart illustrating steps for evaluating links and providing member feedback according to an embodiment of the present invention. This process presumes that a member has added an external link to the community Website on his or her own Website. At step 501 the link verification portion of the system of the invention accesses the URL of Web page hosting the external link. In one embodiment a computing system operated by a knowledge worker or other authorized user is leveraged to complete this step. In another embodiment a server automatically accesses the URL with no human operator. At step 502 the system determines if the external link is present.

If at step 502 the system determines that the link is not present then the process may resolve to step 503 where an error message or some other member feedback is presented to the member indicating that the external link was not found. If at step 502 the system determines that the link is present then at step 504 the system executes the external link to verify if it works correctly.

At step 505 the system determines whether the external link to the community Web site works or not. If at step 505 the system determines that the link does not work correctly, the process may resolve back to step 503 and an error message or other member feedback is presented to the member informing the member that the link is not effective or does not work correctly.

If at step 505 the link works correctly causing navigation to the intended page of the community Website, the quality of the link is evaluated by the system at step 506. The evaluation may use any criteria available to determine if the link is beneficial to the community Website or not. Content relevancy between the host and target pages, ranking of the external site hosting the link, and other criterion may be used to rank the link.

At step 507 the system determines if the link is beneficial to the growth of the community Website, for example, by increasing the search engine ranking of the Website. If at step 507 the system determines that the link is not beneficial to the community Website, then the process may resolve back to step 503 where the system may send feedback to the member describing the quality issue and, perhaps suggesting ways to overcome the poor evaluation of the link. The link may be re-evaluated if the member takes certain steps to improve the quality of the external link beyond what the system provided in the link code. This may involve adding certain search keywords to the host page or other suggested fixes.

At step 507 if the system determines that the link is beneficial to the growth of the community Website, then at step 508 the system may determine what rewards if any are due the member. Rewards may include virtual currency, free access to interactive features at the community Website, reciprocal linking from the community site to the member Website, or other rewards. At step 509 the system displays selected rewards to the member through the member's personalized page at the community Website or through some other interface used by the member.

It will be apparent to one with skill in the art that the automated linking and link verification system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

What is claimed is:

1. A system for link creation, evaluation and reward comprising:

a gaming web site provided by a web server hosted by a gaming enterprise enabling persons, through execution of a browser application, to subscribe, and providing, through software executing from a non-transitory physical medium coupled to the server, one or more video games, one or more structured activities requiring authorization to participate, and virtual currency for subscribers to use for purchasing objects and services at the gaming web site;

a link code application module accessible by subscribers in a browser display of the gaming web site, the link code application module providing code that the subscribers are enabled to copy and paste into individual ones of the subscriber's own electronic forms and Web sites other than the gaming Web site, the code creating a link to the to the gaming Web site;

a link verification module residing on and executable from the Web server; and a subscriber feedback module executing on the Web server providing feedback about link quality to the subscribers accessing and using the link code application module, and distributing rewards and other feedback to said subscribers;

wherein, after a subscriber copies and creates a link to the gaming web site, the link verification module accesses the subscriber's electronic form or Web page and verifies and evaluates the link to the community Web site, wherein the link is automatically tested and content and keywords are evaluated for relevancy to determine a quality ranking for the subscriber contribution, and the subscriber feedback module, based on the evaluation, provides authorization to participate in otherwise limited games and activities, or virtual currency.

2. The system of claim 1 wherein the link code application module includes a variety of different coding types selectable by the subscriber for adding one or more links in one or more of the electronic forms or Web pages other than the gaming Web site, the links directing browsing entities to the gaming Web site.

3. The system of claim 1 wherein the link verification module evaluates the quality of the member's electronic form or Web page newly linking to the community Web site, the form evaluated for content relevancy and search keywords.

4. The system of claim 1 wherein the member feedback module pushes information to subscribers accomplishing linking through the application module relative to the quality of their contribution of linking to the community site.

5. A method for link creation, evaluation and reward, comprising the steps:

(a) creating in a gaming web site a link code application module providing at least one complete code set for establishing a link from a remote web site or electronic form to the gaming Web site, provided by a web server hosted by a gaming enterprise enabling persons, through execution of a browser application, to subscribe, and providing, through software executing from a non-transitory physical medium coupled to the server, one or more video games, one or more structured activities requiring authorization to participate, and virtual currency for subscribers to use for purchasing objects and services at the gaming web site;

(b) making the link code application module accessible to subscribers hosting electronic forms or Web pages other than the gaming Web site;

(c) accessing, by one of the subscribers, the link code application module, copying code from the link code application module, pasting the code into the subscriber's electronic form or Web page, establishing a link to the gaming Web site;

(d) verifying, by a verification module executing on the gaming web site, the link and evaluating the quality of the link, wherein the link is automatically tested and content and keywords are evaluated for relevancy to determine a quality ranking for the subscriber contribution; and (e) providing, via a feedback module executing on the gaming web site feedback, including reward as authorization to participate in otherwise limited games and activities, or virtual currency, to the subscriber who contributed by linking their electronic form or Web page to the community Web site, the reward based on the evaluation determined in step (d).

6. The method of claim 5 wherein in step (a) the link includes a universal resource locator (URL) and includes a text statement promoting an activity at the gaming Web site.

7. The method of claim 5 wherein in steps (c), (d), and (e) are repeated for each link to the community site established by a subscriber.

8. The method of claim 5 wherein in step (c) the electronic form types include other Web sites, Blogs, or social interaction site profile pages.

* * * * *